Figure 1:
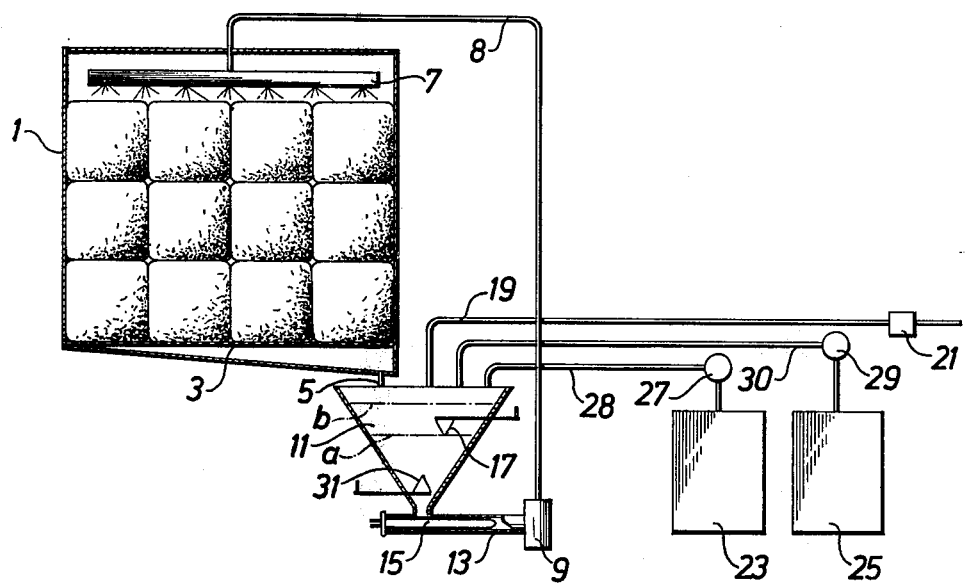

United States Patent [19]

Lagerström et al.

[11] 4,182,780

[45] Jan. 8, 1980

[54] PROCESS AND AN APPARATUS FOR ALKALI-TREATMENT OF LIGNOCELLULOSIC MATERIAL

[75] Inventors: Gösta B. Lagerström, Ängelholm; Nils-Inge Nilsson, Billesholm, both of Sweden

[73] Assignee: Boliden Aktiebolag, Sweden

[21] Appl. No.: 795,511

[22] Filed: May 10, 1977

[30] Foreign Application Priority Data

May 25, 1976 [SE] Sweden .............................. 7605943

[51] Int. Cl.$^2$ .............................................. A23K 1/12
[52] U.S. Cl. .................................... 426/636; 426/626; 426/635; 426/807
[58] Field of Search ............... 426/636, 623, 635, 506, 426/807, 626; 162/86, 90, 248; 134/172, 181, 200; 99/516; 239/185; 118/24, 323, 326

[56] References Cited

U.S. PATENT DOCUMENTS 4,048,341  9/1977  Lagerstrom et al. ............ 426/807 X

*Primary Examiner*—R. B. Penland
*Attorney, Agent, or Firm*—Gordon W. Hueschen

[57] ABSTRACT

A process for increasing the feed value of lignocellulosic materials by alkali-treatment and subsequent neutralization with an acid in a closed system under circulation of the treating agents. Said treating agents are supplied or prepared during the course of the treatment at a rate essentially corresponding to the liquid uptake of the lignocellulosic material, the quantities of residual solutions resulting from the treatment being kept at a minimum. Moreover, an apparatus for carrying such process into effect.

2 Claims, 2 Drawing Figures

PROCESS AND AN APPARATUS FOR ALKALI-TREATMENT OF LIGNOCELLULOSIC MATERIAL

The present invention relates to a process and to an apparatus for alkali-treatment of lignocellulosic materials, such as straw, by treatment with a solution of a base and subsequent neutralization with an acid.

By straw is usually meant the straws remaining after threshing of mature crop. The straw can be used as a fodder for ruminants but its feed value is low in view of a rather far-reaching lignification, i.e. the cellulose has been enclosed in lignine. The lignine incapsules the cellulose and prevents the cellulose-decomposing enzymes from the microorganisms of the rumen from acting. In this form the main value of the straw lies in the fact that it imparts to the fodder mass a structure suitable for the ruminants thereby promoting normal rumen activity, which in turn effects the fodder conversion ability and thereby also the economy of production.

In the table below an analysis for some different types of straw is given.

| Type of plant | Ash contents % | Lignine % | Cellulose % | Pentosanes % |
|---|---|---|---|---|
| Straw of barley | 4 | 14 | 35 | 28 |
| Straw of oat | 5 | 15 | 37 | 29 |
| Straw of wheat | 3 | 17 | 39 | 29 |
| Straw of rye | 4 | 18 | 40 | 27 |

Only a fraction of the above nutritives can be utilized by the cattle. This has for a result that the straw has only delimited possible uses. Primarily growing and low-producing ruminants are given straw, since the straw can cover part of the requirements for maintaining such animals, whereas its contents of nutritives are insufficient for the product. Today straw is therefore mostly considered as a waste and it is common practice that it is burnt in the fields or ploughed down into the soil. Burning is deplorable not only from the point of view that enormous feed values are wasted but also in view of the fact that the heavy smoke generation is inconvenient from an environmental point of view and also because a considerable fire hazard is at hand. Thus, it is highly desirable to recover this fodder reserve found in enormous quantities in the whole world.

In order to expose the cellulose one has to break down or at least create openings in the lignine so that the cellulose-decomposing enzymes from the microorganisms of the rumen will have a possibility of effecting the cellulose. It is known that loosening can be obtained by treatment with different chemicals, such as sodium hydroxide, ammonia, sodium sulphide etc. Mostly sodium hydroxide is used, since it is relatively cheap and also highly effective. Hereby the high-value fodder cellulose can be exposed, which makes the treated straw well suited for part of the total fodder for high-producing ruminants, i.e. animals subject to high requirements with regard to production capacity. Factors of importance for the result of an alkali-treatment of straw are primarily concentration of alkali, pressure, temperature and reaction time.

Methods of treating straw with alkali were known already at the beginning of the 20th century, and different systems have been tested with varying success. Common to processes known up to now is the fact that they are all subject to disadvantages in the form of the formation of waste solutions which are difficult to handle, and due to the fact that great amounts of alkaline and acid solutions will have to be handled for providing effective treatment.

In the following the invention will be described primarily with reference to straw, but it should be noted that the invention in no way is delimited to this but related to the treatment of all types of lignocellulosic materials.

The present invention thus relates to the technique of increasing the feed value of lignocellulosic material by alkali-treatment and subsequent neutralization with acid in a closed system under circulation of the treatment agents. In connection with this technique and as indicated above the formation of residual or waste solutions constitutes an old problem in relation to alkali-treatment of straw. From natural reasons it is desirable to keep the volumes of residual solutions as small as possible whereby without great loss remaining drained alkaline solution can be allowed to stay in the system and there be neutralized by the acid solution and thus be eliminated. However, in practice there are great difficulties of minimizing the residual solution quantities in view of the fact that the absorption capacity of straw varies within relatively broad limits. Thus, this absorption capacity is dependent inter alia on the following factors: Moisture content, type of straw, quality of the straw, degree of pressing, weight variations. Against this background it is, accordingly, necessary to meter the quantity of solutions in such a manner that it corresponds to maximum absorption capacity with due consideration paid to said factors. This in turn means, of course, that the quantities of residual solutions vary greatly in dependence on the character of the treated straw. Thus, it is not always possible to obtain small volumes of residual solution, which in practical operation is desirable, not to say necessary, in view of economy of operation.

The present invention has for its purpose to provide a technique whereby the disadvantages of the prior art are eliminated in a simple and practical manner. The process according to this invention is characterized thereby that alkali or acid solution is added progressively during the treatment at a rate essentially corresponding to the liquid uptake of the lignocellulosic material, whereby the quantities of residual solutions are kept at a minimum.

In a preferred embodiment of the process of this invention the alkali and acid solutions are supplied in the form of concentrates, whereas the water necessary for dilution is added separately synchronously with the liquid uptake of the lignocellulosic material. In practice this liquid supply in accordance with the liquid uptake by the lignocellulosic material is most easily provided by collecting liquid drained from the lignocellulosic material at a level below the lignocellulosic material, the level of the collected liquid being maintained essentially constant by controlled supply of liquid. The treating solutions are preferably supplied to the grass by means of sprinkling from above.

This invention also provides an apparatus for carrying out the process as defined above, and this apparatus includes an alkali-treatment container for the lignocellulosic material to be treated, a distributing means arranged in the upper part of said container for supplying alkali and acid solutions, and an outlet for liquid drained from the lignocellulosic material positioned at the lower part of the container. The apparatus is characterized by a pump mains arranged in connection to said outlet, to which mains solutions are supplied and possibly also separately water, and which at its lower end is connected with the distributing means through a circulation pump and a feed conduit. Moreover, the apparatus contains a level indicator arranged in connection with the pump mains, said indicator controlling the liquid supply to the pump mains in such a manner as to largely keep the liquid level of the mains constant.

In order that the residual solution volumes to the maximum possible extent shall be kept at a minimum it is, of course, preferred that the pump mains in a horizontal plane at the level of the liquid therein has a cross section which is relatively small in relation to the alkali-treatment container. Suitably, the pump mains is in the form of a cone having the pointed end extending downwardly. In order to avoid dry pumping it is suitable to arrange at the lower end of the pump mains a second level indicator which will shut off the circulation pump in case of too low a liquid level in the pump mains.

Figure 2:
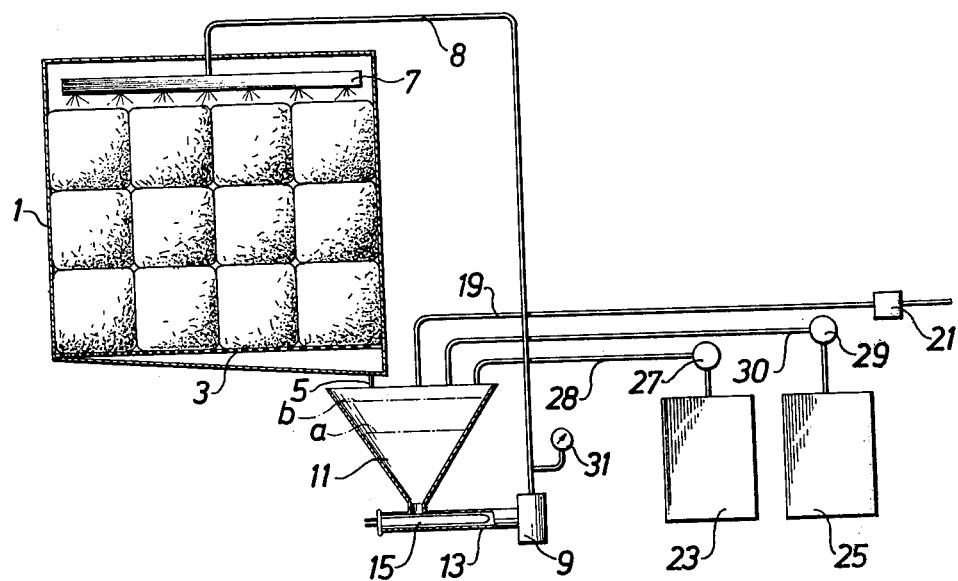

The invention will in the following be described by a non-limiting example in connection with the appended drawings, wherein:

FIG. 1 shows diagrammatically and partly in section a side view of an embodiment of the apparatus according to the invention; and FIG. 2 shows a modification of the apparatus of FIG. 1.

The apparatus shown in FIG. 1 of the drawings includes an alkali-treating container 1 provided with a perforated plate 3 and a bottom outlet 5. As is diagrammatically indicated in the figure the alkali-treating container 1 in this case contains 12 bales of straw resting on the perforated plate 2. At the upper end of the alkali-treating container 1 a distributing device 7 is arranged by which the straw bales are sprinkled from above with the solutions in question. The distributing device 7 is advantageously reciprocated across the upper side of the straw bales in accordance with the technique described in copending application Ser. No. 772,073. The distributing device 7 is supplied with liquid through a feed conduit 8 and a circulation pump 9.

The liquid flowing from the straw bales is discharged through bottom outlet 5 down to a pump mains 11 having the shape of a cone. Pump mains 11 is at its lower end connected to the inlet side of circulation pump 9 through a conduit 13 in which a thermostate-controlled heat cartridge 15 is arranged. Pump mains 11 contains two level indicators 17 and 31, the function of which is further explained below.

Moreover, the apparatus contains an alkali container 23 connected with the pump mains 11 through a feed pump 27 and a conduit 28. Furthermore, the apparatus contains an acid container 25 which, in a corresponding manner, is connected with pump mains 11 through feed pump 29 and a conduit 30. Finally, water can be supplied through a magnet valve 21 and a conduit 19 to pump mains 11.

The function of the apparatus described above is briefly as follows.

It is assumed that the alkali-treating container 1 is filled with untreated straw. The apparatus is started by starting circulation pump 9 and by starting supply of alkaline liquid from container 23 simultaneously with supply of water through conduit 19. Level indicator 17 is connected to magnet valve 21 hereby maintaining a largely constant liquid level in pump mains 11, the level being indicated at a. When the necessary quantity of alkaline liquid has been supplied the supply is interrupted, whereas water is continued to be supplied at a rate corresponding to the liquid uptake of the straw. After liquid circulation for the desired period of time, for example 4 hours, the straw bales are allowed to stand so that the alkali-treatment results in the desired effect. During this period of time a certain small quantity of liquid flows through outlet 5, so that the level of pump mains 11 rises to the level indicated at b. After a certain period of time, for example another 17 hours, the acid metering is started through feed pump 29 and circulation is maintained by means of circulation pump 9 while maintaining the liquid level of pump mains 11 constant in the same way as before. After terminated acid supply and circulation the liquid is allowed to drain from the straw, and the straw is now ready for consumption and is taken out from the alkali-treating container 1. Now, new bales of straw may be inserted and the apparatus can be started and the procedure repeated.

As previously indicated, the second level indicator 31 has for a function to shut off the circulation pump 9 so as to avoid dry pumping should the liquid level of pump mains 11 from some reason sink too far.

In FIG. 2 of the appended drawings there is shown a modification of the embodiment shown in FIG. 1. In this embodiment the level control consists in a manometer 31 connected to the output of pump 9. Said manometer is provided with a built-in pressure-actuated switch which, at a decrease in pressure in view of lack of liquid in pump mains 11, actuates opening of magnet valve 21 simultaneously interrupting the operation of circulation pump 9. After a certain period of time which may be controlled with a time relay, the circulation pump 9 is again started whereas magnet valve 21 is closed. In this manner the liquid level of pump mains 11 is continuously maintained at the desired level. The procedure is, of course, the same also with regard to the neutralization step. In other respects FIG. 2 corresponds fully to FIG. 1 with regard to the meaning of the reference numerals.

The technique described above offers several essential advantages. Thus, in accordance with the main object of the invention, the residual solution volumes may be kept at a minimum. This is, of course, essential from an economic point of view as hereby the consumption of alkaline and acid liquids is kept low. The water supplied to pump mains 11 through conduit 19 can be used to reduce the formation of foam in the pump mains, which in practice can constitute a difficult problem.

The apparatus described above in connection with the drawing may, of course, be modified in several respects. Thus, it is not necessary to supply water to the pump mains 11 separately. Instead, solutions having a concentration suitable for the straw treatment can be stored in containers 23 and 25, and in this case the supply of alkaline liquid and acid, respectively, takes place in pace with the liquid uptake of the straw and in dependence on the level indicator 17. Pump mains 11 may, of course, also be made as an integral part of the alkali-treating container 1, but a separate construction is, however, more suited from a practical point of view with regard to maintenance and repair.

Various modifications and substitutions of equivalents may be made in the process and apparatus of the present invention and will be immediately apparent to one skilled in the art, wherefore the invention is to be limited only by the full scope of the appended claims, including application of the doctrine of equivalent thereto.

What is claimed is:

1. A process for increasing the feed value of lignocellulosic materials by alkali-treatment and subsequent neutralization with an acid in a closed system under circulation of the treating agents, which comprises sprinkling concentrated alkali onto a mass of the material followed by sprinkling water for dilution-absorption onto the mass at a rate essentially corresponding to the absorption of treating agent by the lignocellulosic material and supplying the acid for neutralization in the form of a concentrate, whereby the quantity of residual solution resulting from the treatment is minimized.

2. A process according to claim 1, comprising collecting liquid drained from the ligno-cellulosic material at a level below the ligno-cellulosic material, the level of the collected liquid being maintained essentially constant by controlled supply of liquid.

* * * * *